F. N. CRONHOLM.
MEASURING TURNOUT FOR IRRIGATING SYSTEMS.
APPLICATION FILED DEC. 29, 1916.

1,366,062.

Patented Jan. 18, 1921.
2 SHEETS—SHEET 1.

WITNESSES
Jas. H. McCathran
H. T. Chapman

INVENTOR
Frederick N. Cronholm,
BY
ATTORNEY

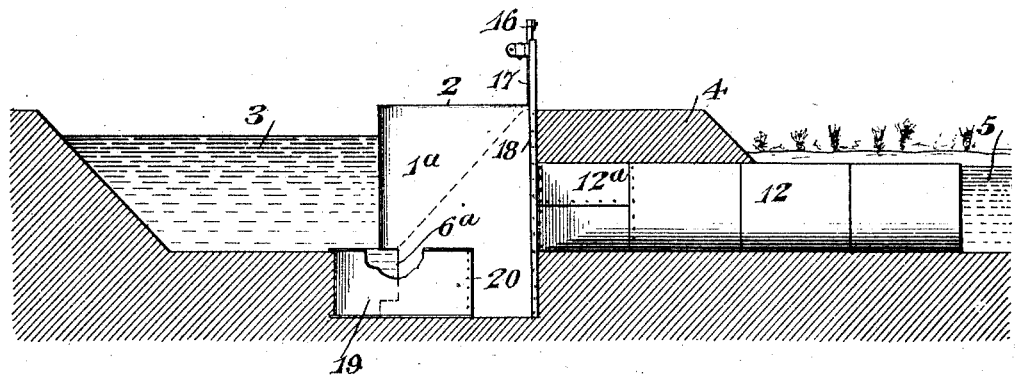
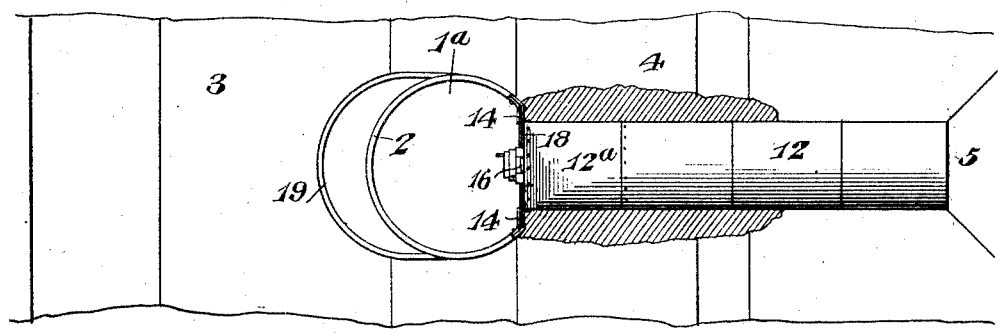
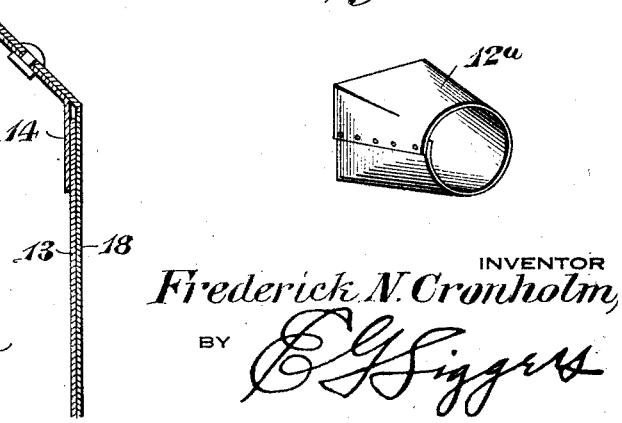

UNITED STATES PATENT OFFICE.

FREDERICK N. CRONHOLM, OF DENVER, COLORADO.

MEASURING-TURNOUT FOR IRRIGATING SYSTEMS.

1,366,062.  Specification of Letters Patent.  Patented Jan. 18, 1921.

Application filed December 29, 1916. Serial No. 139,526.

*To all whom it may concern:*

Be it known that I, FREDERICK N. CRONHOLM, a citizen of the United States, residing at Denver, in the county of Denver and State of Colorado, have invented new and useful Measuring - Turnouts for Irrigating Systems, of which the following is a specification.

This invention has reference to measuring turn-outs for irrigating systems, and its object is to prevent wastage of water and to insure each customer an ample supply where irrigating systems have heretofore resulted in an over supply for some customers and an under supply for others.

In irrigation systems as frequently installed no attempt at an enforced equable distribution of water has been made, so that wastage and consequent lack of supply for some customers results.

Because of varying conditions met in irrigation, accuracy of measurement of water supplied to customers is of moment, and this can only be accomplished by establishing constant conditions at the point of measurement even though conditions throughout the system or in the neighborhood of the point of measurement may vary. The invention, therefore, comprises a gate structure, whereby the flow of water from a supply canal to a lateral may be controlled, and associated with the gate is a stilling pool or tank into which water flows from the supply canal and comes to approximate rest, and from which pool the water may be drawn through the measuring means at a certain head irrespective of variations in the water level of the canal and irrespective of variations in the lateral, so that the measuring gate may be set with accuracy, the term accuracy being used in the sense of meaning such a degree of accuracy as may be practicable in irrigation systems without, of course, demanding absolute accuracy, but avoiding haphazard conditions.

There are so many conditions and influences entering into water distribution that it cannot be made automatic or clocklike. Among the factors to be dealt with are seepage, evaporation, soils, kinds of crops, weather and the personal equation, together with main canal inflow at the source of supply, which is affected by varied precipitation and use by other diverters farther up the stream. All these factors combine in a fashion that necessitates the employment of ditch riders on every project where measurement of water is attempted for the sole purpose of regulating flow and prorating the available supply to suit crop requirements under varied soil and weather conditions. With measuring devices the least possible sacrifice of head is necessary.

In any irrigation system there is but little head left by the time the water reaches the high land on an individual farm, which head can be used for measuring flow.

With the present invention measurements are practicable with a close approach to accuracy and a minimum loss in head for the purpose of measurement.

While measurements have heretofore been attempted the present invention has the advantage of simplicity and cheapness of construction, adaptable to existing installations at a slight expense and in a lasting manner, and capable of incorporation in new installations at a minimum cost.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Fig. 6 is a view similar to Fig. 1, but showing a somewhat different construction.

Fig. 7 is a plan view of the structure of Fig. 6.

Figs. 8 and 9 are sectional and perspective views, respectively, of details of construction.

It is to be understood that the showing of the drawings is to be taken as an example of various structures which may be used for a like purpose, and while structures made in accordance with the showing of the drawings will operate successfully, other structures mechanically quite different from the showing of the drawings, but, in general, functionally the same, may be employed.

Figure 1:
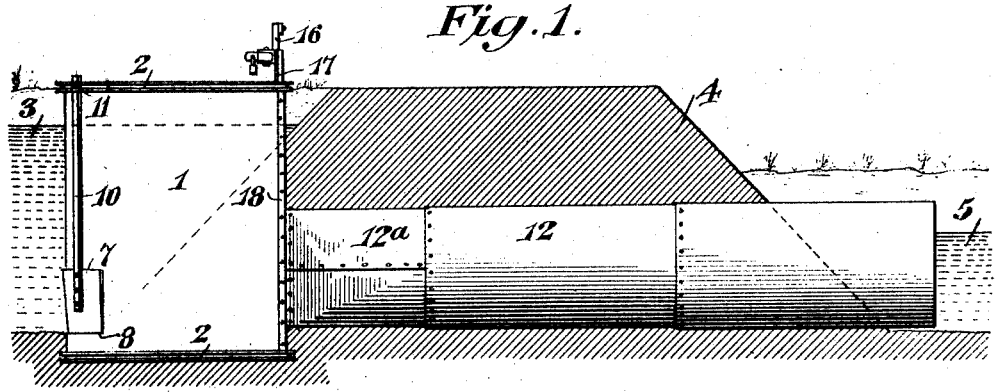
Figure 1 is a side elevation of the device of the invention installed, the bank between the main canal and a lateral being shown in section.
Figure 2:
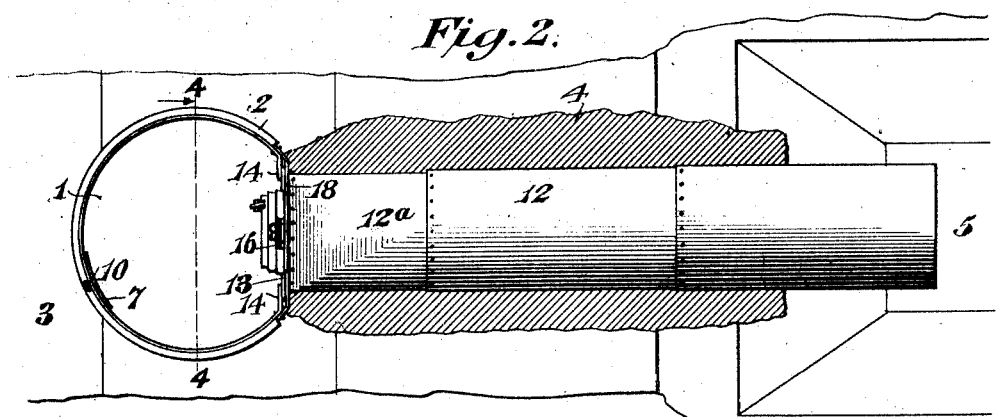
Fig. 2 is a plan view of the structure shown in Fig. 1, with a portion of the dividing bank broken away to show the lateral.
Figure 3:
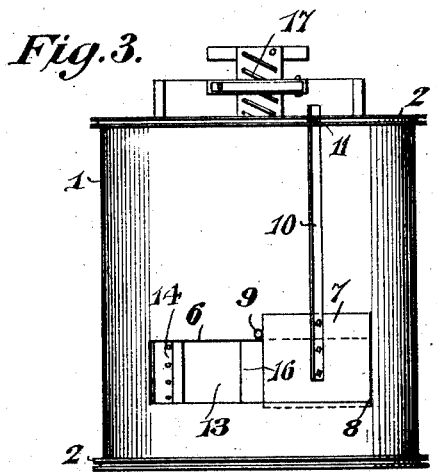
Fig. 3 is a front elevation of the stilling tank.
Figure 4:
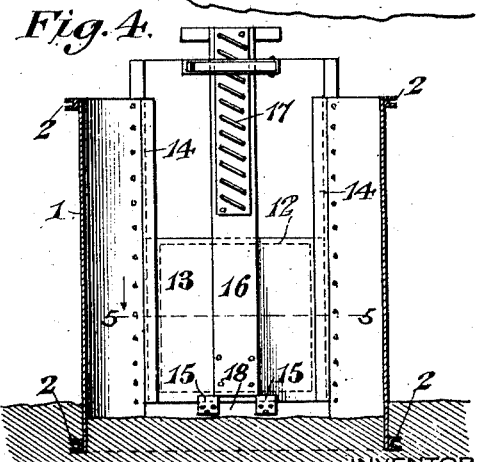
Fig. 4 is a section of the stilling tank on the line 4—4 of Fig. 2.
Figure 5:
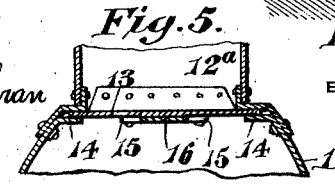
Fig. 5 is a detail section on the line 5—5 of Fig. 4.

There is provided, in the showing of Fig. 1 and associated figures, a stilling tank 1 which may be conveniently made of galvanized steel and of cylindrical conformation, which is the best shape for strength and compactness. The tank may be initially open at the ends and when installed stands upright, with stiffening ribs 2 about the top and bottom. The tank is installed near one side of a main canal 3 adjacent to a bank 4 separating the canal from a lateral 5, by which latter water from the canal is distributed to a point or points of utilization. At a low point on the side of the stilling tank 1 toward the canal 3 is an opening or orifice 6 which may be considerably wider than high, and is so located as to be at or near the bottom of the canal 3, thus providing a submerged opening into the stilling tank. The length of the orifice 6 may be reduced by means of a gate 7 engaged in the orifice with its lower edge behind the wall of the tank 1 and against one end wall of the orifice, as indicated at 8. Then a positioning pin 9 at the other end prevents shifting of the gate lengthwise of the orifice. The gate is provided with a stem 10 rising therefrom, and this stem may be conveniently carried through the upper rim 2 and may have a perforation 11, or some other arrangement whereby the gate 7 can be held in closed position by a suitable lock. For instance, by reducing the opening 6, a proportionately less amount of water will flow into the stilling tank, provided, however, that an outlet gate, to be described, is adjusted to maintain the same difference in water elevation as existed before the gate was inserted. On opening the gate the full capacity of the orifice 6 may be utilized, the said opening 6 being of a size corresponding to the outlet from the stilling tank. The gate 7 may be omitted, but when fine readings are wanted it helps to keep the percentage of error in gage readings the same for small diversions as for large diversions in a device of a given capacity.

Connected to that side of the stilling tank remote from the opening 6 is a tube 12 leading through the bank 4 and discharging into the lateral 5. This tube where attached to the tank is larger in area than it is a short distance therefrom, that is, it is funnel shape, as indicated at 12$^a$, and is controllable by a gate 13 mounted in guides 14 and resting when closed upon stops 15 within the stilling tank. The funnel form of the tube 12 is of marked importance because of the easy entrance of water into it, which permits reducing the entire structure more than would otherwise be possible for a given device.

Moreover, the areas of the tube 12 and orifice 6 may be approximately alike for the larger sizes and graded down so that in the smaller sizes the orifice 6 is about one-half as large as the tube 12. The gate 13 is supplied with a stem 16 having holding, setting and measuring means, showing the amount of gate opening, represented at 17, and which may correspond to the locking means for gates of irrigating canals shown in my application No. 84,690, filed March 16, 1916.

A portion 18 of the stilling tank 1 along which the gate 13 moves is flat and in chord relation to the cylindrical tank.

The chord portion 18 is shown as separately formed and overlapping and riveted to the tank 1 on opposite sides of a cut-away part of the tank which terminates in flanges coöperating with the chord portion to form the guides 14 for the gate 13, as shown in Fig. 8.

As to relative sizes of the various parts, so long as the discharge is large enough it does not matter how much larger it is, neither does it matter how large the stilling pool is compared with the amount of inflow, so long as it is of sufficient size to satisfactorily still the water so surface readings can be determined. There is, however, a relation between the size and shape of the submerged orifice 6 and the radius of the stilling pool. For instance, if with a given orifice and radius the discharge for a certain pressure head be determined, then if either the orifice or the radius be changed the table of discharge would be incorrect and must be rectified.

The structure shown in Figs. 6 and 7 is in the main similar to that shown in Fig. 1 and associated figures, but differs in that there is a tank 1$^a$ in all respects like the tank 1 except that the orifice 6 and the outlet 12$^a$ are so related that the top of the orifice 6 and the bottom of the outlet 12$^a$ are about on a level, so that when the device is installed the top of the orifice 6$^a$ is about on the same level as the bottom of the lateral 5. Protecting the orifice 6$^a$ is a spillway formed by a shield 19 indicated as of curved form of a height to reach from the bottom of the tank 1$^a$ to the top of the orifice 6$^a$ and made fast at the ends to the sides of the tank 1$^a$, as indicated at 20.

The orifice 6 or 6$^a$ has to be submerged in order to measure flow, and as it is desirable to measure the flow with small loss of head, the orifice 6 and the discharge tube 12 have their bottom face in about the same plane in the arrangement shown in Fig. 1. When still less loss of head is desirable the top of the orifice is placed on a plane with the bottom of the discharge tube, as shown in Fig. 6, in which case the spillway shield 19 is provided.

The spillway shield has the advantage of preventing erosion by water entering the orifice under high velocity, in which case it is necessary to install the device with the spillway crest at canal grade elevation in order to make the delivery of all the water flowing and in measuring small quantities, and at the same time having the orifice submerged. It will be understood that other arrangements may be provided, but those shown are deemed sufficient, and it is unnecessary to illustrate such other arrangements.

When water flows from the main canal into the stilling tank or chamber, it meets water already therein, and by having the capacity of the stilling chamber considerably more than that of the outlet, say, a four to one relation, the surface of the water in the stilling tank becomes quiet and hence by means of established tables it is an easy matter to set the outlet gate in accordance therewith, so that irrespective of variations of level in the main canal 3 or demand from the laterals, a determined flow may be established with practical accuracy.

The relatively large size of the stilling tank brings about such a stilling of the surface of the water rushing therein through the orifice 6 that the surface elevation may readily be determined and compared with the water outside or in the canal 3. Moreover, by having the tank 1 relatively large ample room is provided in its walls for the orifice 6 which must be of suitable capacity and be sufficiently submerged in the canal.

When the gate 13 is closed the water level in the tank 1 is the same as in the canal. If the gate 13 be raised then the discharge through the pipe 12 causes a corresponding lowering of the water level in the tank. The water in the tank therefore rises and lowers as compared with the water in the canal and this depends on whether the gate be closed or opened with the difference controlled by the gate. Knowing such difference it is easy to determine the discharge, and, by compiling tables of discharge from actual test, reliable data are to be expected.

The device is primarily intended for making diversions from canals having a water depth less than about three feet, but is not limited to any exact depth.

Where water is or has been plentiful in streams and ditches the necessity for close measurement has not been felt, but with greater demand for water and with the supply limited, and consequently with an increase in the value of the water, the necessity for a more efficient and simple means of measurement and distribution is apparent. This is the history of the development of every irrigated community, and the need is increasingly exacting since the demand for water progressively increases. Consequently the prevention of waste is a matter of public importance.

The invention insures just distribution and inspires confidence because of its simplicity and ease of understanding. The invention provides a more compact and simple structure for the delivery of the water with greater accuracy of results and with less loss of head than has heretofore been attained.

What is claimed is:—

1. A measuring turn-out for irrigating systems, comprising an open top cylinder with a laterally extended inlet orifice of constant height arranged to be submerged in an irrigation canal, said cylinder having a chord portion opposite the inlet orifice, and provided with an outlet pipe extending therefrom for connection with a lateral, and a flat measuring gate movable up and down over the outlet pipe along the chord portion of the cylinder to control the effective cross sectional area of said outlet pipe.

2. A measuring turn-out for irrigating systems, comprising a stilling tank in the path of flow of water from an irrigating canal to a lateral, with the stilling tank having its interior wholly free from obstructions, and provided with a freely open inlet, and positive measuring means at the outlet capable of adjustment by minute steps, the outlet extending to a greater height than the inlet.

3. A measuring turn-out for irrigating systems, comprising a stilling tank with a freely open submerged inlet orifice of constant height having means for varying its lateral extent, and an outlet pipe leading from the stilling tank near the lower end thereof, said tank having measuring means associated with the outlet pipe where leaving the tank.

4. A measuring turn-out for irrigating systems, comprising a cylinder for installation in an upright position in an irrigating canal, and having a laterally elongated inlet orifice of constant height near the lower end for submergence in the canal, a pipe leading from the lower portion of the cylinder opposite the inlet for discharge into a lateral, and said cylinder having a chord portion where connected to the outlet pipe, and a controllable gate movable up and down along the chord portion of the cylinder for determining the outflow from the tank through the outlet pipe.

5. A measuring turn-out for irrigation systems comprising a cylinder for installation in an upright position in a lateral or sub-lateral, said cylinder having a laterally elongated orifice and a chord portion opposite the orifice and provided with an outlet opening, said orifice having its bottom portion in submerged relation to the bottom of the outlet opening, a tube connected to the outlet opening and having a portion of greater cross-sectional area where connected to the cylinder, and a controllable gate for regulating the amount of discharge from the tank through the outlet tube.

6. A measuring turn-out for irrigation systems, comprising a cylinder for installation with one end submerged with relation to a canal or lateral, said cylinder having an inlet orifice with a spillway associated therewith, and set in the path of flow of water entering the cylinder by way of the orifice, the cylinder being provided with a chord portion opposite the inlet orifice, a funnel-shaped tube or pipe leading from the lower part of the chord portion of the cylinder for discharge into a lateral, and a controllable gate for regulating the discharge by controlling the difference in water elevation between that in the cylinder and that outside in the canal.

7. A measuring turn-out for irrigation systems comprising a tank for installation in a lateral or sub-lateral and provided on opposite sides with a laterally elongated inlet orifice and an outlet opening, respectively, the inlet orifice having its bottom portion in submerged relation to the bottom of the oulet opening, a tapering discharge pipe leading from the outlet opening, and a controlable gate at the outlet opening for regulating the amount of discharge from the tank through said opening.

8. A measuring turn-out for irrigation systems, comprising a tank for installation in a lateral or sub-lateral and provided on one side with a laterally elongated inlet orifice having a spillway associated therewith and leading thereto, said tank being provided with an outlet opening opposite the inlet orifice with the latter having its bottom portion in submerged relation to the bottom of the outlet opening, a tapering pipe leading from the outlet opening, and a controllable gate associated with the outlet opening for regulating the amount of discharge from the tank through said outlet opening.

9. A measuring turn-out for irrigating systems, comprising a stilling tank for location in the path of flow of water from an irrigating canal to a lateral and provided with a spill-way in front of its inlet orifice, and positive measuring means at the outlet.

10. A measuring turn-out for irrigating systems, comprising a stilling tank for location in the path of flow of water from an irrigating canal to a lateral and provided with a spill-way in front of the inlet orifice, with the mouth of the spill-way higher than the bottom of the stilling tank.

In testimony that I claim the foregoing as my own, I have hereto affixed my signature in the presence of two witnesses.

FREDERICK N. CRONHOLM.

Witnesses:
   J. E. JAMES,
   FRANK ADAMS.